United States Patent [19]
Tokuda et al.

[11] Patent Number: 4,829,394
[45] Date of Patent: May 9, 1989

[54] DEVICE FOR DETECTING REFERENCE POSITION OF MAGNETIC HEAD

[75] Inventors: Kazuhiro Tokuda; Toshikatsu Harase, both of Tokyo, Japan

[73] Assignee: Fuji Photo Film Co., Ltd., Kanagawa, Japan

[21] Appl. No.: 39,880

[22] Filed: Apr. 20, 1987

[30] Foreign Application Priority Data

Apr. 18, 1986 [JP] Japan .................. 61-89554
Apr. 18, 1986 [JP] Japan .................. 61-89555

[51] Int. Cl.4 .............................. G11B 5/54
[52] U.S. Cl. ...................... 360/75; 360/106; 74/665 GA
[58] Field of Search ............... 360/75, 78, 105, 106, 360/109, 97–99; 364/32, 33, 41, 219, 55–57, 233, 30, 215, 225, 221; 250/231 SE; 74/421 R, 665 GA; 318/685, 696

[56] References Cited

U.S. PATENT DOCUMENTS 3,646,261  2/1972  Kinjo et al. ............... 360/78
4,313,141  1/1982  Yanagida et al. .......... 360/106

FOREIGN PATENT DOCUMENTS 57-191827  11/1982  Japan .................. 360/109

Primary Examiner—Alan Faber
Assistant Examiner—Steven R. Garland
Attorney, Agent, or Firm—Sughrue, Mion, Zinn, Macpeak & Seas

[57] ABSTRACT

A device is disclosed for detecting a position of reference for the movement of a magnetic head when the magnetic head is moved by a driving force from a rotary driving source in the radial direction of a magnetic disc. A plurality of rotary members having speed reduction ratios different from each other are rotated by the rotary driving source, and a time, at which phases of these rotary members coincide with each other, is made to be the position of reference. Here, the speed reduction ratios of the plurality of rotary members are selected such that the phases of the plurality of rotary members coincide with each other only once during the movement of the magnetic head over the all of area of the magnetic recording.

2 Claims, 4 Drawing Sheets

| STEPPING MOTOR PULSE NUMBER | 0 | 25 step | 50 step | 25×n step | 25×24 =600 steps | 25×25 =625 step | 25×26=650 steps |
|---|---|---|---|---|---|---|---|
| GEAR OF Z=25 ROTARY NO. (ROTARY ANGLE) | 0 | 1 TURN (360°) | 2 TURNS (720°) | n TURNS | 24 TURNS (8640°) | 25 TURNS (9000°) | 26 TURNS (9360°) |
| GEAR OF Z=26 ROTARY NO. (ROTARY ANGLE) | 0 | $\frac{25}{26}$ (346.15···) | $\frac{50}{26}$ (692.30···) | $\frac{25 \times n}{26}$ ( ) | $\frac{25 \times 24}{26}$=23.07··· (8307.692) | $\frac{25 \times 25}{26}$=24.03··· (8653.84···) | $\frac{25 \times 26}{26}$=25 TURNS (9000°) |
| | ⇨ TRACK0 TRACK 2 +1 step | | TRACK 4 +2 step | | ⇨ TRACK 50 | ⇨ TRACK 52 +1 step | TRACK 54 +2 step |

DEVICE FOR DETECTING REFERENCE POSITION OF MAGNETIC HEAD

BACKGROUND OF THE INVENTION

1. Field of the Invention

This invention relates to a device for detecting a reference position of a magnetic head, and more particularly to a device for detecting a reference position of a magnetic head to perform magnetic recording or reproduction on a cassette type magnetic disc while moving in the radial direction of the magnetic disc.

2. Description of the Prior Art

Recently, there has been developed an electronic camera system wherein an image pickup device, such as a solid state image sensing device or ,an image pickup tube, is combined with a recording device using an inexpensive magnetic disc as a recording medium and having a comparatively high memory capacity. A subject is still-photographed electronically and recorded onto a rotating magnetic disc. The reproduction of an image is carried out by a television system, a printer or the like, which are provided separately.

In an image recording or reproducing system using such a magnetic disc as described above, there is used the disc having a diameter of about 50 mm. Furthermore, in this magnetic disc, there is formed a recording pattern from track 1 to track 52 from the outer peripheral side toward the inner peripheral side. The magnetic head feed is about 100 µm, which is substantially smaller than the feed pitch of an ordinary floppy disc, so that the magnetic head should be moved with very high accuracy. A home position serving as a starting position (move starting position) of the magnetic head is provided at a predetermined position located at the outer peripheral side from the track 1 within the track 1 and functions as a reference position when the magnetic head is transferred in the radial direction of the magnetic disc for recording or reproducing. An end position serving as a tail end position (ending position) of the magnetic head is provided at a predetermined position located at the inner peripheral side from the track 52 and functions such that the magnetic head does not move over a predetermined recording range of the magnetic disc. Accordingly, in the magnetic disc device of the electronic camera system, it is necessary that the home position and the end position be detected so that the feed of the magnetic head may be stopped at the home position or the end position.

Further, when the magnetic head is fed at a constant value to perform recording onto the magnetic disc, the home position functions as a reference position for forming the respective tracks, so that the detection of the home position should be performed with high accuracy and the magnetic head should be stopped with high accuracy.

As a device for detecting the reference position of the type described, there have heretofore been used a leaf switch operable by a head carriage for moving the magnetic head when the magnetic head reaches the aforesaid reference position, and a device, wherein rotation of a stepping motor to drive the magnetic head is reduced, transmitted to a disc having a photoslit which is detected by a photointerruptor.

However, these devices are low in speed to a considerable extent, whereby the position detecting accuracy is low, so that these devices cannot be applied solely as means for detecting the reference position of the magnetic head.

SUMMARY OF THE INVENTION

The present invention has been developed to obviate the above-described disadvantages of the prior art and has as its object the provision of a device for detecting a reference position of a magnetic head, capable of detecting the reference position easily and with high accuracy.

The present invention features that, in a system comprising: a rotary driving source; a head carriage having a magnetic head and movable by being guided by guide members; and means for converting a driving force of the rotary driving source into a motion of the head carriage in the rectilinear direction and transmitting the same; wherein the magnetic head is moved in the radial direction of a magnetic disc housed in a magnetic disc pack to thereby perform the recording or reproducing, there are provided a plurality of rotary members rotatable by the rotary driving source and having speed reduction ratios different from each other, said reduction ratios being selected such that phases of the plurality of rotary members coincide with each other only once while the magnetic head moves over the all area of the magnetic recording and means for detecting a time at which the phases of the plurality of rotary members coincide with each other, and a position of the magnetic head at the time at which the phases of the plurality of rotary members coincide with each other is made to be a reference position.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of a device for detecting a reference position of a magnetic head according to the present invention with reference to the accompanying drawings.

Figure 1:
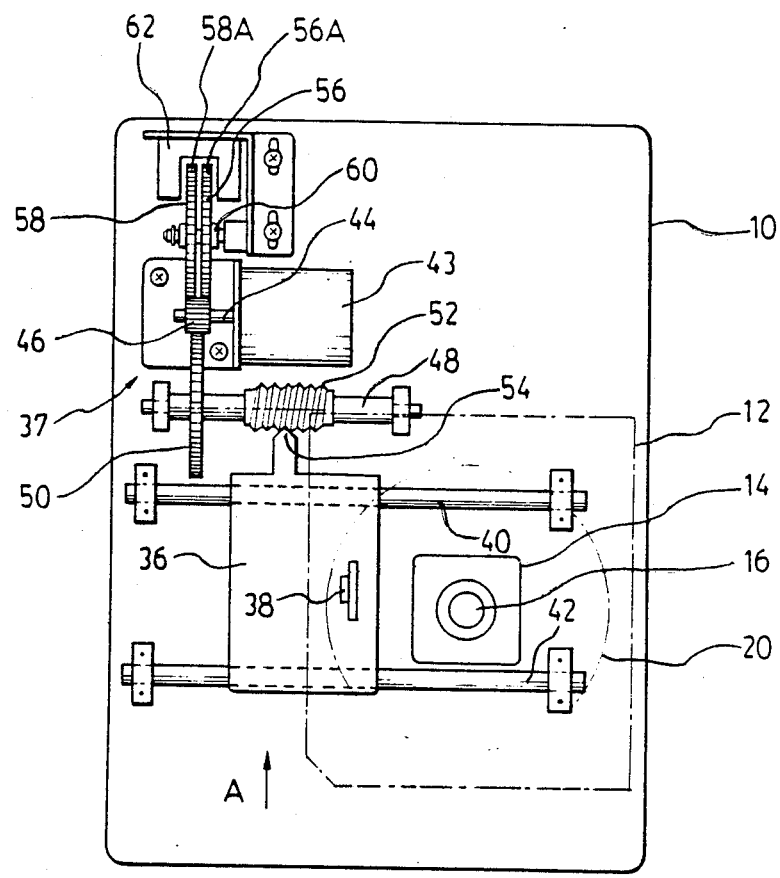
FIG. 1 is a plan view showing the general arrangement of this embodiment.

FIG. 1 is a plan view showing this embodiment. As shown in FIG. 1, a cassette-tape magnetic disc recording system such for example as a main body 10 of an electronic camera or a reproducer is formed into a rectangular shape. As indicated by hypothetical lines in FIG. 1, a magnetic disc pack 12 is rested on and engaged with this main body 10 such that a disc 20 housed in the disc pack 12 is rotated by a rotary shaft 16 of a motor 14 for driving the disc.

Figure 2A:
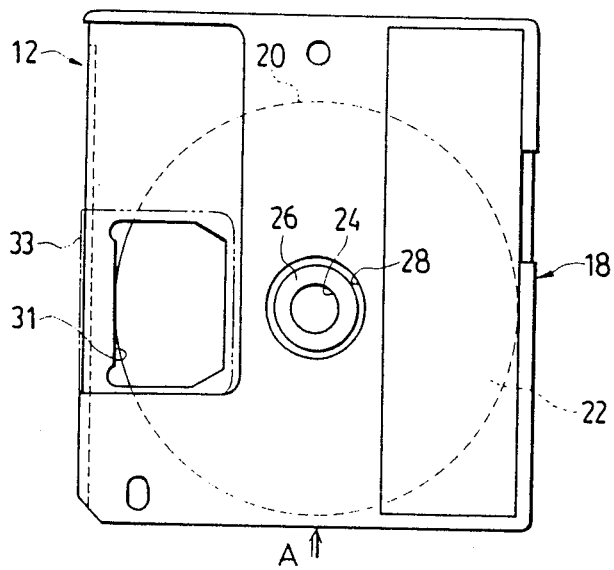
FIGS. 2(A) and 2(B) are a front and a rear views showing a magnetic disc pack used in the above embodiment of the present invention.
Figure 2B:
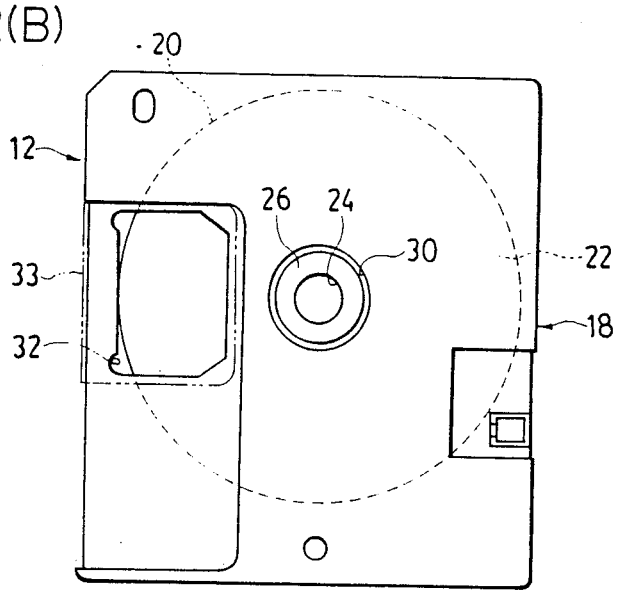

First, description will be given of the construction of the disc pack 12. The disc pack 12, as the front surface and the rear surface thereof are shown in FIGS. 2(A) and 2(B), is comprised of a pack body 18 and a magnetic disc 20 rotatably housed in the pack body 18, and is rested on the main body 10 of the system with the outer surface thereof being directed upwardly so that the end faces indicated by arrow-marks A in FIGS. 1 and 2(A) are common with each other.

The magnetic disc 20 is comprised of a disc-shaped magnetic recording material 22 formed at the rear surface thereof with a recording layer and a center core 26 provided in the center thereof with a hole 24 engageable with rotary shaft 16 of the motor 14 for driving the disc. The pack body 18 has openings 28 and 30 for exposing the center core 26 of the magnetic disc 20 and openings 31 and 32 for exposing a recording surface and a non-recording surface of the magnetic disc 20, and the magnetic head is protruded toward the recording surface through the opening 32 to be able to perform the recording or reproducing. A member indicated by a two-dot chain line 33 is a shutter, and, when the pack body 18 is inserted into or removed from the reproducer, the shutter 33 slides so as to open or close the openings 31 and 32.

Now, as shown in FIG. 1, the main body 10 of the system is slidably provided thereon with a head carriage 36. Namely, the head carriage 36 has a magnetic head 38 for performing the magnetic recording or reproducing of the magnetic disc 20 housed in the disc pack 12, and is slidable along guide bars 40 and 42 which are fixed on the main body 10 of the system to the right or left in FIG. 1. A turning force of the stepping motor 43 is transmitted to the head carriage 36 via a gear train 37, whereby the head carriage 36 is finely fed. More specifically, an output shaft 44 of the stepping motor 43 provided thereon with a gear 46 which is in meshing engagement with a gear 50 provided on an intermediate shaft 48. This intermediate shaft 48 is provided thereon with a screw gear 52 being in meshing engagement with a pin 54 projected sideways from the head carriage 36. With this arrangement, the turning force of the stepping motor 43 is transmitted to the head carriage 36.

Description will hereunder be given of a device for detecting a home position and an end position of the magnetic head 38.

Figures 3, 4:
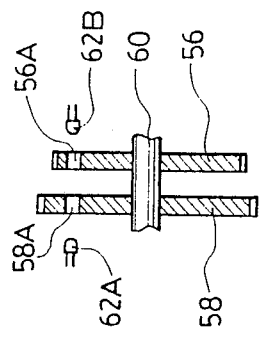
FIG. 3 is a sectional view showing the essential portions of this embodiment.
FIG. 4 is a view showing the relationship between a pair of gears for detecting a position as used in this embodiment; and, FIG. 5 is a front view showing another embodiment.

Gears 56 and 58, which are coaxially provided on a shaft 60, are in meshing engagement with the gear 46 of the output shaft 44. The gear 56 is formed to have a tooth number of $Z_{56}=25$, and gear 58 is formed to have a tooth number of $Z_{58}=26$. In order to bring the gears 56 and 58, having different number of teeth from each other into meshing engagement with the common gear 46, shifts in gears are carried out between the gears 56, 58 and 46. Further, as shown in FIG. 3, the gears 56 and 58 are formed therein with through-holes 56A and 58A, respectively, and a detecting section 62 is provided at opposite sides of the gears 56 and 58. The detecting section 62 is constituted by a light emitting element 62A and a light receiving element 62B, and delivers a signal to the stepping motor 43 to control the movement of the stepping motor 43 when the through-holes 56A and 58A of the gears 56 and 58 coincide with each other.

Action of the embodiment of the present invention with the above-described arrangement will be described as follows.

First, the turning force of the stepping motor 43 is reduced in its speed through the gear train 37. The stepping motor 43 rotates through 18° per step. The stepping motor 43 is driven by twelve steps by the gear train 37. When reduced in speed by the gear train 37, the head carriage 36 can be moved by 100 microns. Thus, the magnetic head 38 is moved by one track (100 microns) relative to the magnetic disc 20 housed in the disc pack 12, so that the recording or reproducing can be carried out.

Furthermore, the positional relationship between the through-holes 56A and 58A of the gears 56 and 58 becomes as shown in FIG. 4. In a table shown in FIG. 4, when the feed step number of the stepping motor 43 is zero, if the through-holes 56A and 58A are made to coincide with each other, then the gear 56 (having the tooth number of $Z_{56}=25$) makes one turn through 25 steps, and the gear 58 (having the tooth number of $Z_{58}=26$) makes a 25/26 turn. Then, when the stepping motor 43 is rotatably driven through 650 steps and the gear 56 (having the tooth number of $Z_{56}=25$) makes 26 turns, the gear 58 (having the tooth number of $Z_{58}=26$) makes 25 turns, whereby the through-holes 56A and 58A coincide with each other again. Accordingly, a time, at which the number of feed steps of the stepping motor 43 is zero, is set to a home position, and a time, at which the number of feed steps is 650, is set to an end position, and a position where the through holes 56A and 58A coincide with each other, is detected by the detecting section 62, whereby the head carriage 36 is stopped, so that the magnetic head 38 can be located at the home position or the end position.

Additionally, in selecting the tooth numbers of the gears 56 and 58, it is necessary that the through-holes 56A and 58A coincide with each other only once during movement of the magnetic head over the all area of the magnetic recording.

Since the pulse number of the stepping motor 43, necessary for the movement of the magnetic head 38 from a track 0 to a track 52 is 624 in this embodiment, the tooth number $Z_{56}$ of the gear 56 is set to 25 and the tooth number $Z_{58}$ of the gear 58 is set to 26 and the least common multiple $25 \times 26 = 650$ is made to be larger than the aforesaid pulse number, however, the present invention need not necessarily be limited to this, and any combination of gears different in tooth number from each other may be used only if the least common multiple of the plurality of gears is larger than the aforesaid pulse number.

Furthermore, the gears 56 and 58 are coaxially provided in this embodiment, however, the present invention need not necessarily be limited to this, and the gears may be provided on shafts separate of each other. However, in this case, it becomes necessary that two detecting sections detecting the through-holes 56A and 58A, respectively, are provided and a logic circuit for taking AND conditions of detected outputs from these detecting sections is provided.

Figure 5:
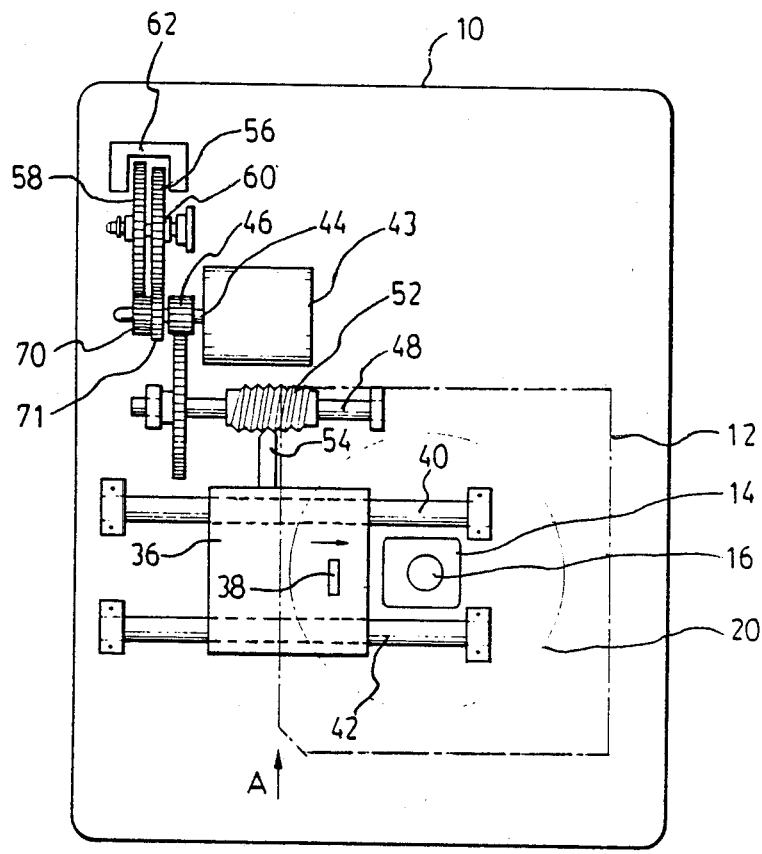

FIG. 5 shows another embodiment of the present invention. In the embodiment shown in FIG. 5, the same or similar members shown in FIG. 1 are depicted by the same reference numerals as the latter to avoid doubled description. In the embodiment shown in FIG. 1, the gears 56 and 58 which are different in tooth number are brought into meshing engagement with the common gear 46 by shifts of gears, however, the present invention need not necessarily be limited to this, and, as in the embodiment shown in FIG. 5, gears 70 and 71 are secured to the output shaft 44, the gear 70 is brought into meshing engagement with he gear 58, and further, the gear 71 is brought into meshing engagement with the gear 56. Even with this engagement, the turning force from the stepping motor 43 is transmitted to the gears 56 and 58, a position where the through-holes 56A and 58A of the gear 56 and 58 coincide with each other is detected by the detecting device 62, so that the magnetic head 38 can be stopped at the home position or the end position.

In the above embodiment, the coaxial gears are used is the detecting members, however, rotary discs and the like may be used instead of the gears.

As has been described hereinabove, according to the present invention, the plurality of rotary members different in speed reduction ratio from each other are rotated by the rotary driving source and the respective reduction gears are selected such that the phases of these rotary members coincide with each other only once during the movement of the magnetic head over the all of area of the magnetic recording, so that the time at which the phases of the plurality of rotary members coincide with each other can be made to be the reference position of the magnetic head. Furthermore, at this time, the speed reduction ratios of the respective rotary members need not necessarily be made large, detection of the time at which the phases of the plurality of rotary members coincide with each other, i.e. detection of the reference position of the magnetic head can be carried out with high accuracy.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. In a recording/reproducing apparatus including a rotary driving source for driving a drive gear, a head carriage having a magnetic head thereon, guide means for guiding said head carriage, and means for transmitting a driving force of said rotary driving source into a rectilinear motion of said head carriage, wherein said magnetic head is movable in a radial direction of a magnetic disc housed in a magnetic disc pack to record onto or reproduce from said magnetic disc, the improvement comprising a device for detecting a reference position of said magnetic head, comprising: a plurality of coaxially and rotatably disposed gears having the same diameter but having different numbers of teeth, each of said gears being in meshing engagement with said drive gear due to the arrangement of said teeth and having a through bore on the same radius for detecting a rotary position of each of said gears, said different numbers of teeth being selected such that each of said through bores coincide with one another only once while said magnetic head moves over the entire area of the magnetic disc; and a photo-sensor including a light emitting element and a light receiving element respectively disposed on opposing sides of said plurality of gears for optically detecting a time when said through bores coincide with one another wherein a position of said magnetic head at said detected time is used as a reference position of said magnetic head.

2. In the recording/reproducing apparatus of claim 1, wherein said rotary driving source is a stepping motor and wherein the numbers of teeth of said plurality of gears are selected such that the least common multiple of the numbers of teeth of said plurality of gears is larger than a pulse number of said stepping motor allowing for movement of said magnetic head over the entire area of the magnetic disc.

* * * * *